UNITED STATES PATENT OFFICE.

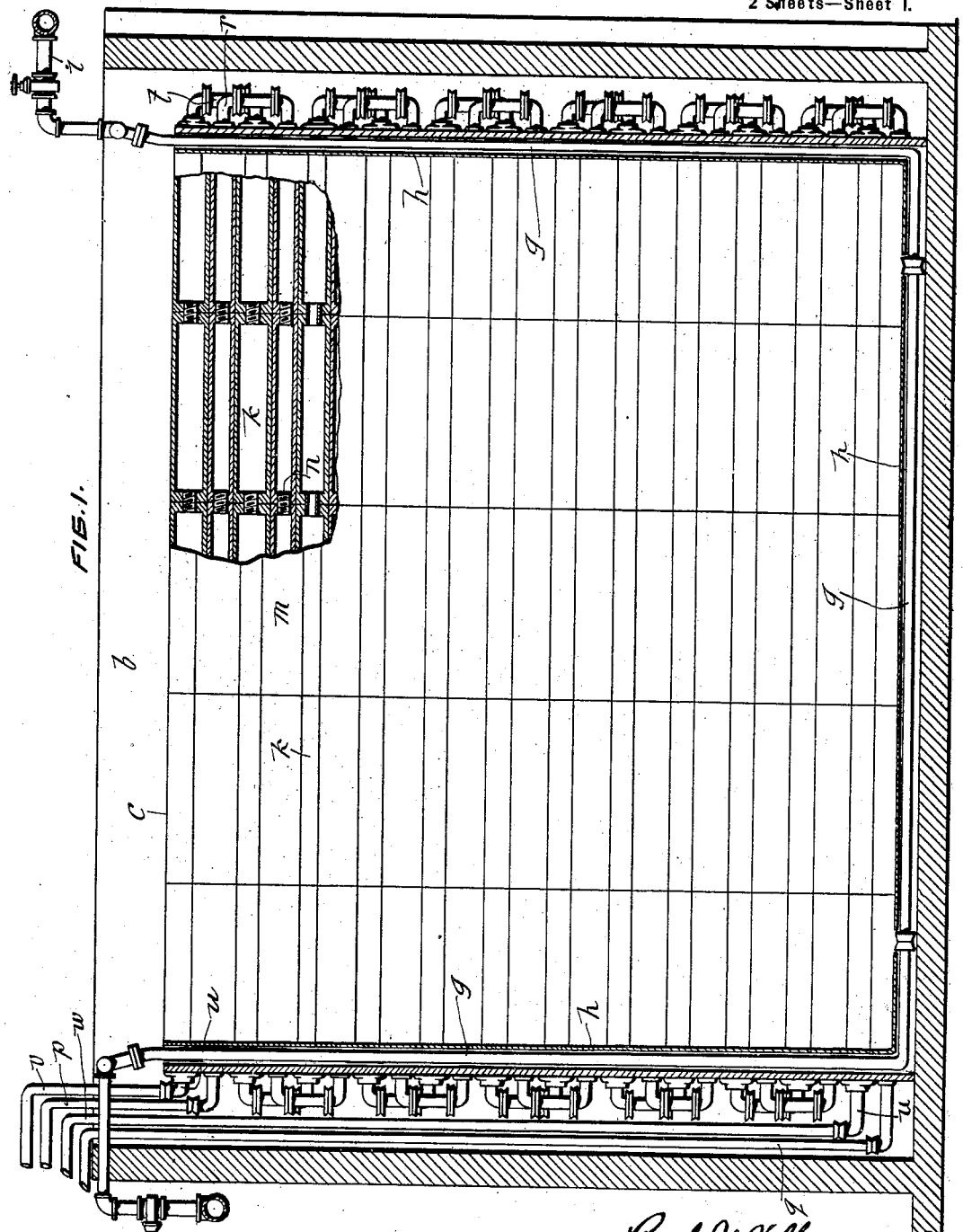

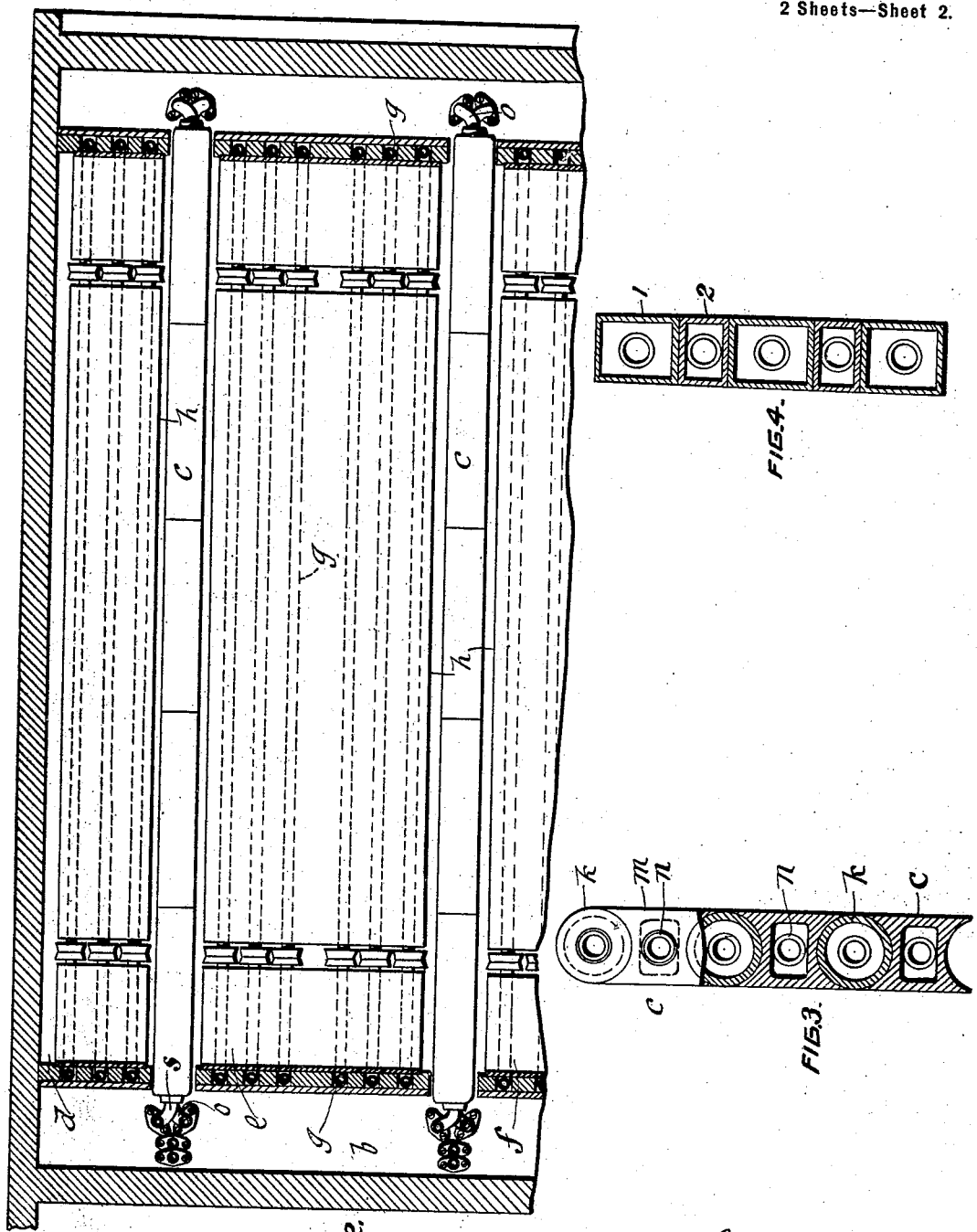

CARL WILHELM VOLLMANN, OF MONTREAL, CANADA.

FREEZING APPARATUS.

SPECIFICATION forming part of Letters Patent No. 685,310, dated October 29, 1901.

Application filed January 14, 1901. Serial No. 43,282. (No model.)

*To all whom it may concern:*

Be it known that I, CARL WILHELM VOLLMANN, of the city of Montreal, in the district of Montreal and Province of Quebec, Canada, have invented certain new and useful Improvements in Freezing Apparatus, of which the following is a specification.

My invention relates particularly to apparatus for use in providing plate-ice for refrigeration purposes; and the object thereof is to economize the amount of freezing fluid heretofore necessary to produce a given quantity of ice and to obviate the danger attendant upon and cost of the freeing of the ice plates or blocks from the walls of the freezing-tanks.

The invention may be said, broadly speaking, to consist in providing a series of freezing-sections and interlaying said freezing-sections with a series of sections adapted to, during the freezing operation, augment said freezing operation and when the plate of ice is complete to serve for thawing the block from its freezing-plates.

More specifically speaking, the invention may be said to consist in forming, preferably, the divisional walls of the usual freezing-tank of a series of superimposed hollow sections, the alternating sections of said series being connected to a freezing-fluid supply, such as ammonia, while the interlaying sections are connected to a supply of a liquid with a low freezing-point, such as brine, and adapted to at times be supplied warm.

For full comprehension, however, of my invention reference must be had to the accompanying drawings, forming a part of this specification, in which similar reference characters indicate like parts, and wherein—

Figure 1 is a longitudinal sectional view and illustrating particularly the independent connections between the ammonia and brine supplies and the freezing and thawing sections of the tank. Fig. 2 is a plan view thereof. Fig. 3 is an enlarged transverse vertical sectional view of a portion of one of my improved freezing-walls, and Fig. 4 is an enlarged detail sectional view showing a modified construction of freezing-wall.

The tank proper, $b$, is, as usual, provided with division-walls $c$, extending longitudinally thereof, and the bottom and ends of each of the divisional parts $d$, $e$, and $f$ of the tank are lined with pipes $g$, covered by plates $h$, these latter pipes being fed from the usual brine-supplying means (not shown) through supply-pipe $i$.

The walls $c$, to which my invention in the present preferred embodiment is applied, are built up of alternate pipe lengths $k$ and horizontal series of hollow cast-iron sections $m$, the top and bottom faces of the latter being grooved to partially inclose the pipe lengths they interlay for purposes of fitting. The sections $m$ have their ends diminished and interiorly screw-threaded to receive coupling-nipples $n$, while the end sections of each horizontal series are set at an angle, as at $o$, and are (commencing with the uppermost horizontal series) coupled at one end to the brine-supply pipe $p$ and at its other end by an elbow $r$ to the corresponding end section of the horizontal series next below it. The opposite end section of this latter horizontal series is correspondingly connected to the horizontal series next below it, and in a like manner all the horizontal series are coupled together. The end of the lowermost horizontal series not coupled to those above it is, like one end of the uppermost horizontal series, connected to the return brine-pipe $q$, thus forming a continuous zigzag passage or conduit. The pipe lengths $k$ are formed with their ends $s$ set at an angle opposite to that at which the ends $o$ of the cast-iron section $m$ are set, and said pipe lengths are coupled together, as at $t$, in a like manner to said sections $m$, thus forming a continuous zigzag passage or conduit, the horizontal portions of which interlay the said horizontal series $m$, and the ends thereof are connected, respectively, by nipples $u$ to the supply and return pipes $v$ and $w$ of the usual freezing-machine, (not shown,) or, if desired, the walls $c$ may be constructed of alternate series of square pipe, as shown in Fig. 4, and which may be of equal cross-section, or those 1 larger than 2, as shown, or the walls may be formed of any other suitable alternating conduits.

In carrying out the operation of freezing in an apparatus constructed according to the foregoing the subdivisions $d$, $e$, and $f$ of the vat are filled with water to within a short distance of the tops of the walls $c$, the brine-pipes $g$ and the brine-sections $m$ of the walls in the meantime having been filled with brine. The ammonia or other freezing fluid is then fed to the freezing-pipes $k$ and the freezing operation carried on in the usual way. When the plates of ice are completed, I pump warm brine into the wall sections $m$, thereby raising the temperature of said walls and freeing the sides of the ice plates therefrom, while the bottom and ends of the blocks are released from the plates in the usual way by pumping warm brine into the pipes $g$.

The advantageous features of the above apparatus are the speedy loosening of the ice plates from the freezing-walls, effected by the use of alternate layers of freezing-pipes and brine-sections instead of freezing pipes or sections throughout, as has formerly been the practice, and the obviation of the danger to the freezing machinery from the freezing pipes or sections being used alternately as a freezer and condenser. According to my method of thawing, the warm brine can be circulated from the brine-tank (not shown) through the brine-circuit constituted by the sections $m$, nipples $n$, coupling-elbows $r$, and supply and return pipes $p$ and $q$ until the freezing-pipes in the freezing-circuit have absorbed sufficient heat from the warm brine to raise its temperature above 32°, and thereby release the ice plates.

What I claim is as follows:

1. In a freezing apparatus a freezing section or plate consisting of a series of receptacles arranged a short distance from one another and a second series of receptacles interlaying and completely filling the space between said first-mentioned receptacles, both series being exposed to contact with the water to be frozen, a freezing-fluid supply to said first-mentioned series of receptacles and a supply of a liquid with a low freezing-point to the interlaying sections, as set forth.

2. In a freezing apparatus a dividing-wall or freezing-plate formed of two series of hollow sections exposed to contact with the water to be frozen, the sections of one series interlaying and completely filling the space between the sections of the other series to form a continuous intact wall, and an independent flow and return to each series, substantially as described.

3. The combination with a freezing-tank, of a dividing-wall formed of a pair of zigzag conduits exposed to contact with the water to be frozen, the major portions of one of said conduits interlaying and completely filling the space between the major portions of the other, and an independent flow and return to each of said conduits, substantially as described and for the purpose set forth.

4. The combination with a freezing-tank, of a dividing-wall comprising a series of horizontal pipe lengths, a series of elbows connecting said horizontal pipe lengths together at their ends to form a continuous conduit, supply and return pipes connected respectively to opposite ends of said conduit; a series of hollow sections arranged end to end in a horizontal row, a series of nipples coupling said sections together, a series of said horizontal rows interlaying said pipe lengths, a series of elbows coupling the ends of said horizontal rows together to form a continuous conduit, supply and return pipes connected respectively to the opposite ends of said last-mentioned conduit, and means for filling the interstices between said pipe lengths and hollow sections, substantially as described and for the purpose set forth.

5. The combination with a freezing-tank of a dividing-wall comprising a series of horizontal pipe lengths, a series of elbows connecting said horizontal pipe lengths together at their ends to form a continuous supply and return pipes connected respectively to opposite ends of said conduit; a series of hollow sections arranged end to end in a horizontal row, a series of horizontal rows interlaying said pipe lengths, and having their top and bottom sides formed to partially inclose the contiguous pipe lengths, a series of elbows coupling the ends of said horizontal rows together to form a continuous conduit, supply and return pipes connected respectively to the opposite ends of said last-mentioned conduit, substantially as described and for the purpose set forth.

In testimony whereof I have affixed my signature in presence of two witnesses.

CARL WILHELM VOLLMANN.

Witnesses:
FRED. J. SEARS,
ARTHUR H. EVANS.